(12) United States Patent
Simon et al.

(10) Patent No.: US 12,202,205 B2
(45) Date of Patent: Jan. 21, 2025

(54) DEVICE AND METHOD FOR THE ADDITIVE MANUFACTURE OF A WORKPIECE

(71) Applicant: Intom GmbH, Stockach (DE)

(72) Inventors: Martin Simon, Bodmann-Ludwigshafen (DE); Severin Ebner, Bermatingen (DE)

(73) Assignee: Intom GmbH, Stockach (DE)

( * ) Notice: Subject to any disclaimer, the term of this patent is extended or adjusted under 35 U.S.C. 154(b) by 665 days.

(21) Appl. No.: 17/259,219

(22) PCT Filed: Jul. 8, 2019

(86) PCT No.: PCT/EP2019/068299
§ 371 (c)(1),
(2) Date: Jan. 11, 2021

(87) PCT Pub. No.: WO2020/011730
PCT Pub. Date: Jan. 16, 2020

(65) Prior Publication Data
US 2021/0252791 A1    Aug. 19, 2021

(30) Foreign Application Priority Data

Jul. 11, 2018   (DE) .................... 10 2018 116 790.3

(51) Int. Cl.
*B29C 64/393*     (2017.01)
*B22F 10/85*      (2021.01)
(Continued)

(52) U.S. Cl.
CPC ............ *B29C 64/393* (2017.08); *B22F 10/85* (2021.01); *B22F 12/90* (2021.01); *B33Y 10/00* (2014.12);
(Continued)

(58) Field of Classification Search
CPC ....... B29C 64/393; B33Y 10/00; B33Y 30/00; B33Y 50/02; G01B 11/25; G01B 15/04;
(Continued)

(56) References Cited

U.S. PATENT DOCUMENTS

2018/0079033 A1* 3/2018 Krueger ................ B29C 64/25
2019/0302043 A1* 10/2019 Lobastov .............. B22F 10/38

FOREIGN PATENT DOCUMENTS

EP    3323617 A1 * 5/2018 .............. B22F 10/00
EP    3323617 B1 * 2/2022 .............. B22F 10/00

* cited by examiner

*Primary Examiner* — Jamel M Nelson
(74) *Attorney, Agent, or Firm* — Bachman & LaPointe, P.C.

(57) ABSTRACT

A device for additive manufacturing of a workpiece (10; 30) having a cell-like building space (24) for the workpiece to be built, preferably layer by layer, and an additive manufacturing unit (14; 34, 36) provided on or in the building space, wherein a workpiece measurement apparatus (16, 18, 20; 40, 42; 82, 86) is provided on or in the building space such that the workpiece measurement apparatus that provides the workpiece with irradiation from an irradiation source has a detector unit (22; 42) configured to detect an irradiation image of the workpiece provided with the irradiation on and/or through an outer wall of the workpiece, and/or to detect a nuclear spin image of the workpiece provided with the magnetic field excitation, and to generate workpiece measurement data from the irradiation image or the nuclear spin image.

12 Claims, 5 Drawing Sheets

(51) Int. Cl.
  *B22F 12/90*     (2021.01)
  *B33Y 10/00*     (2015.01)
  *B33Y 30/00*     (2015.01)
  *B33Y 50/02*     (2015.01)
  *G01B 11/25*     (2006.01)
  *G01B 15/04*     (2006.01)
  *G01N 23/046*    (2018.01)
  *G01N 24/08*     (2006.01)
  *G05B 19/418*    (2006.01)
  *G06T 7/00*      (2017.01)
  *B22F 10/28*     (2021.01)
  *B22F 12/00*     (2021.01)

(52) U.S. Cl.
  CPC ............... *B33Y 30/00* (2014.12); *B33Y 50/02* (2014.12); *G01B 11/25* (2013.01); *G01B 15/04* (2013.01); *G01N 23/046* (2013.01); *G01N 24/085* (2013.01); *G05B 19/41875* (2013.01); *G06T 7/001* (2013.01); *B22F 10/28* (2021.01); *B22F 12/38* (2021.01); *G01N 2223/419* (2013.01); *G05B 2219/32368* (2013.01); *G06T 2207/10081* (2013.01); *G06T 2207/30164* (2013.01)

(58) Field of Classification Search
  CPC ............... G01N 23/046; G01N 24/085; G01N 2223/419; G05B 19/41875; G05B 2219/32368; G06T 7/001; G06T 2207/10081; G06T 2207/30164
  See application file for complete search history.

DEVICE AND METHOD FOR THE ADDITIVE MANUFACTURE OF A WORKPIECE

BACKGROUND OF THE INVENTION

The present invention relates to a device for additive manufacturing of a workpiece. Furthermore, the present invention relates to a method for additive manufacturing of a workpiece which is also suitable in particular for operating the generic device.

Devices for additive manufacturing (also known as "generative manufacturing") are generally known from the state of the art. Devices and methods for additive manufacturing, often labelled as "3D printing", describe ways to produce, typically computer-aided and without manual intervention, the desired workpiece from a base material—in many cases, almost any inner and outer contour can be realized. In this respect, it is possible and known to form a powdery material into the desired final shape of the workpiece by applying suitable connective materials (additionally or alternatively by sintering or methods similar to sintering) and to selectively apply a (e.g. polymer) material by melting, for example by means of laser assistance or otherwise known heated nozzles. Additionally, additive (generative) manufacturing technology includes the carving out or pulling out of the workpiece to be produced from a liquid phase (of the starting material). All of these known technologies (which shall be considered to be included by the generic term of additive manufacturing within the scope of the present invention) therefore allows almost any contouring and formability of the starting material into the final shape of the workpiece, limited only by usable interior dimensions of the building space to be used for the building (typically layer by layer) of the workpiece, the building space usually being enclosed by suitable walls or similar limitations in the form of a cell.

This almost universal usability of additive manufacturing technologies has played a key role in attracting the attention of virtually all manufacturing companies; additionally, these types of manufacturing technologies are becoming applicable to more and more products and applications.

However, a consequence of the additive building (typically layer by layer) of the workpiece from the (starting) material is that especially the manufacturing of a voluminous and complex structure requires a considerable amount of time; the material used, the additive manufacturing technology used, parameter limits of the material and the process and the physical size often determine a minimum manufacturing time, which is why a generic additive manufacturing technology—despite the universality—is still primarily suitable for a use in prototypes and small series (or highly complex products), but not for the large-scale manufacturing of workpieces. Other conventional manufacturing methods are suitable for said large-scale manufacturing. Furthermore, starting materials suitable for additive manufacturing methods are usually more expensive than raw materials for mass manufacturing technologies.

Especially workpieces which have a complex contour, design and wall thickness(es) require a complex quality test of a completed workpiece, because methods of the additive manufacturing technology are not uncritical with respect to quality aspects: For process-related reasons, errors can occur anywhere on the workpiece, in principle also within a body surrounded by the manufacturing material (construction material), for example in the form of bubbles, unintentional cavities or the like. This also applies to any possible geometry deviation from a defined nominal dimension.

However, with respect to the quality test, such-process-related-manufacturing problems are not uncritical, because in particular defects and errors hidden in the body (or in the material) cannot be detected by means of conventional optical test technologies; the detection of hidden manufacturing errors and similar defects in a completed workpiece rather requires (otherwise known) computer tomography or X-ray technologies. Such a detection (like geometric defects detection by means of traditional external measurement and test methods, such as optical methods, contacting methods or other topological methods) ensures that the completed workpiece is classified as being faulty as soon as an exceedance of critical tolerances is detected. Accordingly, the workpiece produced in a time—and material—consuming manner (and whose quality is additionally laboriously tested) is disposed of as reject; this has corresponding disadvantageous effects on the manufacturing efficiency, in particular in fluctuating or hardly calculable manufacturing processes.

With respect to the specific problem situation of additively manufactured workpieces needing complex testing, it must also be noted that the disadvantages of the technologies known per se add up; workpieces produced in a long process by means of 3D printing or similar additive manufacturing technology are complex and expensive to manufacture and require elaborate (and expensive) testing technology, reject thus being particularly disadvantageous. At the same time, it is these additive manufacturing technologies whose inherent quality issues make it necessary to control the quality particularly carefully, in particular in workpieces which are geometrically complex and/or sensitive with respect to mechanical and surface properties.

Another problem is not only that required investments in additive manufacturing technology are high, but that a (starting) material for an additive manufacturing technology is usually also more expensive than a material for other manufacturing methods, reject in the form of inadequate workpieces at the end of an additive production process thus worsening the economic disadvantages in this regard, as well.

SUMMARY OF THE INVENTION

Therefore, the object of the present invention is to overcome the disadvantages of known additive production or manufacturing methods, in particular with respect to the production of complex workpieces which need a special amount of testing. In this regard, the expensive manufacturing and production process (resulting not least from the high investment costs), including quality testing, is to be accelerated, disadvantageous reject is to be reduced and the conditions for quality testing of improved calculability of additively manufactured workpieces are to be established in general.

Said object is attained by the device for additive manufacturing of a workpiece as disclosed herein and by the method for additive manufacturing of a workpiece also as disclosed herein, wherein the method is also suitable in particular for operating the device according to the invention, but is not limited to this purpose. Advantageous embodiments of the invention are described herein and in the dependent claims.

In an advantageous manner according to the invention, the present invention integrates a technology for measuring the workpiece in the form of the workpiece measurement means according to the invention into an installation for additive manufacturing (known per se), said integration according to the invention creating the conditions for the detection of critical workpiece measurement data during the additive building (usually layer by layer) of the workpiece, i.e., before its completion.

According to the invention, said workpiece measurement data can not only be used to assess whether the completed or developing workpiece corresponds to the relevant dimensioning and/or quality specifications or whether process errors have occurred which render the workpiece unusable, meaning the workpiece is to be disposed of as reject. In such a case, the invention allows the determination of said reject situation already during the manufacturing process; accordingly, the manufacturing process can be cancelled and the unsuitable partially completed workpiece can be disposed of—in a time- and material-saving manner—without having to wait until the workpiece is completed (involving corresponding unnecessary work).

Additionally, the present invention allows the (further) workpiece manufacturing process of the additive manufacturing means to be influenced on the basis of the workpiece measurement data obtained by the measurement according to the invention, in particular if identified dimensional deviations or similar phenomena are within a permissible margin of tolerance, but nevertheless make it necessary to adapt the manufacturing process for other material (for following layers, for example). In this way, even a potential reject part which would inevitably result from an unchanged process can be put back on track to becoming a good part, considerable efficiency improvements thus being achievable in this way (both in terms of time and material).

Within the scope of the invention, not only typical three-dimensional workpiece contour data which could be obtained by known optical or contacting methods are considered workpiece measurement data; density data of the constructed workpiece, i.e., for example, data relating to inclusions, cavities or other sections inside the material which are not readily identifiable from outside, are also workpiece measurement data within the scope of the invention. Furthermore, workpiece measurement data according to the invention include inner contour data, such as wall profiles in an inner area away from an outer wall section, which are not readily identifiable from outside by conventional measurement methods, either.

By means of the present invention, said workpiece measurement data can be obtained by irradiation or magnetic resonance imaging methods, wherein, within the scope of the present invention, in particular the irradiation includes an application of a projected dot, stripe or line pattern to an outer wall of the workpiece (corresponding to known technologies of stripe projection enabled by means of laser, for example), wherein geometric (and therefore three-dimensional) contour data can be obtained by triangulation methods or similar evaluations; within the scope of the present invention, however, the irradiation according to the invention is particularly preferably realized as radiography, namely by projecting X-rays or other ionizing radiation of an (ir-)radiation source suitably and usually placed on or in the cell-like building space onto the developing (or completed) workpiece and an X-ray detector, which is usually disposed at the opposite end, generating an image of the radiography as an irradiation image, allowing in particular the potentially problematic hidden material defects, inclusions or the like to be determined reliably.

In particular if this quality test and measurement technology realized and integrated by the irradiation source and the detector means is performed continuously and repetitively during the additive manufacturing process, this provides the opportunity of directly reacting to the occurrence of dimension, density, material or contour defects and of changing the manufacturing process by means of the manufacturing correction means according to the invention in such a manner that the identified defects can either be corrected in the course of further material application or can be returned into the permissible tolerance range. In the negative case and if an unrecoverable manufacturing defect has been identified, a decision on a cancellation of the additive manufacturing of the specific workpiece could otherwise be taken, in fact usually well before additional time—and material—consuming manufacturing steps are—unnecessarily—performed until the final state is reached.

Within the scope of preferred embodiments of the invention, the manufacturing correction means according to the embodiment interact with manufacturing process control means of the manufacturing means which realize the additive manufacturing technology. Particularly preferably, measurement specification means and comparison means are assigned to the manufacturing correction means and allow current workpiece measurement data (usually generated continuously in an ongoing additive manufacturing process) to be compared with data provided by the measurement specification means on the basis of, for example, existing stored specification or target data, additionally or alternatively generated by measuring a good part which is within the specification range (by means of the detector means according to the invention). Preferably, additional preferred tolerance and/or threshold means can be used to determine whether a current manufacturing state of the workpiece complies with the specifications (determined by the measurement specification means) plus a tolerance, where applicable, or whether the process should be changed or cancelled.

Another embodiment of the invention ensures that the process monitoring and measurement technology according to the invention of the additively manufactured workpiece covers only those areas of the workpiece (or applies the irradiation only to those wall areas or, if radiography is used, introduces the radiation only into those wall areas) which already allow a reliable error diagnosis, namely areas or sections which are already mechanically solid and therefore completed with respect to the forming and contouring. The testing of the invention has demonstrated that, if melted material is applied layer by layer, for example, numerous phenomena prohibiting a reliable error diagnosis occur in the border area of the melting application before the material has cooled. In this respect, the advantageous embodiment of the invention provides that during the building of a workpiece built layer by layer, only a part of the outer wall or an outer wall section of a finished contour and/or made of solid or solidified layer material is irradiated or detected. The relevant outer wall section which is irradiated (or detected by the detector means) particularly preferably has a distance from a layer material still in the melted state.

Within the scope of the invention, the term "outer wall" is to be understood as a section or area of the (completed or developing) workpiece which forms the contour and which is also present in this form in a final or completed state (which means that an inner and/or hidden wall facing away from the irradiation source—e.g. an inner sheath of a hollow-cylindrical workpiece—is also an outer wall according to the invention); by contrast, an upper melting layer, for example, which characterizes a temporary outer contour of the developing workpiece, is not an outer wall according to the present invention.

With respect to the irradiation and detector technology to be used, in particular in the case of radiography, numerous embodiment options are available in order to flexibly and efficiently generate the desired workpiece measurement data already during the additive manufacturing. Since the additive manufacturing process requires a certain amount of time and the workpiece to be produced is built (usually layer by layer), an X-ray detector unit which has a limited size along the direction of manufacture (i.e., usually in a vertical direction) is particularly preferably used for realizing the detector means, wherein, in practice, X-ray surface or line detectors are usually used for that purpose. The latter can not only be relatively cost-efficient, but they also have possible advantages in the form of the limited height, a reduced rotation angle range, a shorter scanning time, an improved image quality due to reduced scatter (in particular if metal is used). Advantageously, via suitable stepper motors or similar technologies, not only is such a line detector guided along the direction of manufacture of the workpiece, but a (relative) rotation movement in relation to the workpiece to be built or just built is also realized. In this way, a lateral size of an X-ray detector can be limited and further minimize the complexity on the part of the device correspondingly. However, it is impossible to distinguish a concept of a-single-line or multi-line-line detector from a "surface detector", because line detectors having a (correspondingly) high number of lines qualify as surface detectors.

Although, in principle, it is possible to realize such a relative movement (including a rotary or spiral movement) between the workpiece on one side and the irradiation source/detector means on the other side by a rotary plate solution or a similar rotary drive for the workpiece to be built, such a variant is likely to increase the complexity of the 3D (additive) manufacturing technologies; for this reason, it would be preferred to produce an assembly composed of an X-ray source and an X-ray detector (and a workpiece located between them) which can be rotated and moved vertically for realizing a spiral movement, for example, opposite to a workpiece to be built which is held or supported statically. In this regard, too, numerous variants, including options of linear movement, are conceivable and depend on the geometrical conditions of the cell-like building space and on the specific requirements for the testing of the workpiece (with respect to the geometry and to the material to be tested).

In principle, the present invention also allows the advantages according to the invention to be realized in the form of a conceivable spatial separation between the additive manufacturing means (for building the workpiece layer by layer) on one side and the workpiece measurement means on the other side, for example by removing a workpiece which is produced by means of additive manufacturing technology and which is not yet completed from the additive manufacturing means by means of position-standardized inserts and inserting the workpiece into workpiece measurement means at a standardized or predefined position in order to perform the irradiation (in particular radiography) according to the invention. Although there is no complete instrumental integration in this realization, the advantages of the method according to the invention can nevertheless be realized, namely the option of influencing the process or even cancelling the process if a need for adaptation of the manufacturing process or even a need for disposal of a workpiece which is not yet completed is identified, which, in turn, has advantageous effects on the overall efficiency of the manufacturing process.

While CAD data are usually used as a data source for the additive manufacturing according to the invention from which the described specification or correction data are generated, in particular scanned data of existing model components (model workpieces) can also be used as a data source. In an additional embodiment of the invention, master data (specification data) of the model workpiece could be generated (received) in a first step by means of the existing workpiece measurement means and the master data could then be converted into voxel data or intermediate data which are supplied to the additive manufacturing means.

An advantageous embodiment of this aspect of the invention, for which independent protection is sought (not only within the scope of the method according to the invention, but also as an advantageous embodiment of a device and/or of a method for additive manufacturing in which the workpiece measurement means do not necessarily have to be provided at or in the building space and/or the generation of the workpiece measurement data has taken place as a separate (upstream) process using the—completed—model workpiece), provides that the conversion of the data along the process chain is performed directly and without intermediate data format (or with a reduced number of intermediate formats) from the detector means into the control format of the 3D printer (additive manufacturing means). Said printer data are preferably generated as contour data in a machine-specific format (of the additive manufacturing means, e.g. in the so-called G-code) directly from projection output data of the detector means realized as an X-ray detector without intermediate data conversion into an interpolated intermediate format, for example the STL format described above and/or another three-dimensional voxel format. In addition to the increased accuracy of the measurement—e.g. avoidance of the known chord or secant errors of the STL format-, the advantage of said embodiment is a significant reduction of the computation time, which, in turn, has an advantageous effect on the process runtime and processing time.

More precisely, this (independent) aspect of the invention provides that the irradiation image according to the invention (which is usually available as a plurality of two-dimensional pixel data which are disposed at an angle to one another and are resolved in greyscale) is either translated into the (two-dimensional G-code typically available in layers) machine-specific format directly via conventional data transformation processes or that the machine-specific format is alternatively obtained via one intermediate format only (in the present example, the usual step of transforming the irradiation image into three-dimensional threshold information, so-called voxel data, is also provided); in the second case, the advantage of intermediate formatting into three-dimensional surface data (e.g. STL mentioned above) no longer being necessary would also be achieved.

As a result, concept-related problems of traditional additive manufacturing technology are overcome by the invention in a surprisingly simple and elegant manner, in particular if this additive manufacturing technology requires careful and laborious test and quality assurance technologies. While the apparent disadvantage of an integration of a typical X-ray tomography system into a 3D printing system may not be obvious at first sight (for example with respect to the necessary shielding requirements against the ionizing radiation), the advantages of the present invention show that, if a suitable integration is provided, the potential of existing additive manufacturing methods can be expanded in a very elegant manner and, at the same time, the efficiency of this technology can be significantly increased.

BRIEF DESCRIPTION OF THE DRAWINGS

Further advantages, features and details of the invention are apparent from the following description of preferred exemplary embodiments of the invention and from the drawings; in the drawings.

DETAILED DESCRIPTION

Figure 1:
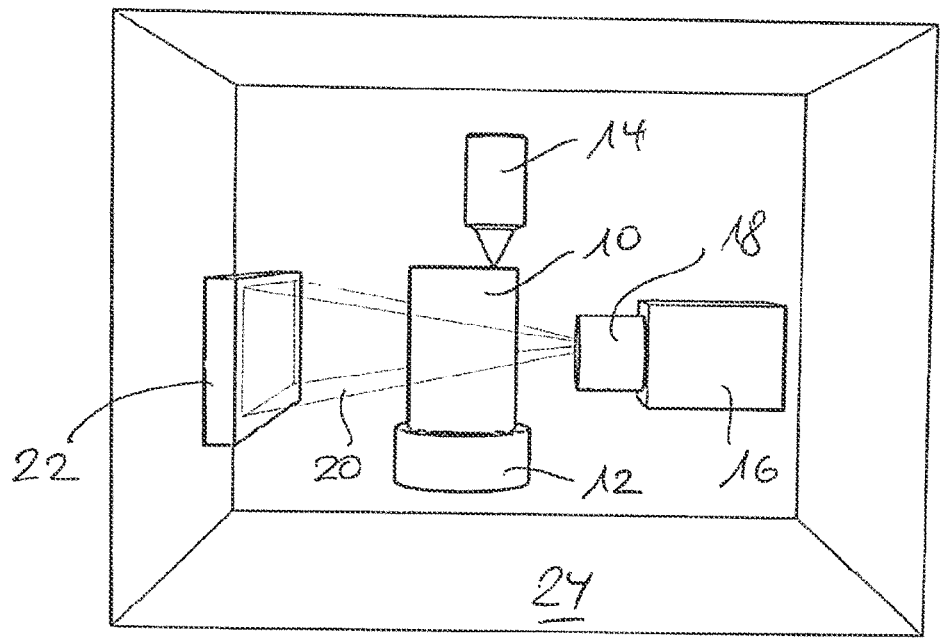
FIG. 1 shows a schematic view of the device for additive manufacturing of a workpiece according to a first exemplary embodiment of the invention.

In the schematic, three-dimensional view, FIG. 1 shows an option of a basic structure for realizing a device for additive manufacturing of a workpiece ("AM machine"). A (developing) workpiece 10 still in the process of being manufactured is held so as to be movable in a rotatory manner on a rotary plate device 12; as a depositing nozzle, a schematically shown print head 14 applies a starting material for producing workpiece body 10 layer by layer in a generally known manner along a vertical direction in the drawing layer of FIG. 1.

According to the principle of the present invention, a three-dimensional measurement device for the workpiece is assigned to the additive manufacturing device (additive manufacturing means) in such an integrative manner that an X-ray source 16, 18 (irradiation source) directs a focused X-ray beam—a three-dimensionally split beam path 20 is schematically shown—at workpiece 10 and irradiates workpiece 10 with the ionizing X-rays. As shown by beam path 20, the irradiation from source 16 leads to a radiography of the workpiece up to a detector unit (detector means) 22 which is disposed on the opposite side along the beam path in relation to workpiece 10, and which, in the present case realized as an X-ray surface detector, electronically detects the irradiation image, i.e., the image of the radiography of workpiece 10 in the present case, and supplies it to electronic evaluation means (not shown in detail) for further electronic processing and image editing. Additionally (not shown in FIG. 1), workpiece measurement means 16, 18, 22 are adjustable in height along the vertical (reference planes of FIG. 1), the radiography thus being performable at different levels of the workpiece.

The combination of the three-dimensional/additive manufacturing device and the three-dimensional measurement device shown schematically in FIG. 1 is enclosed by a housing (enclosure) 24 which is configured to shield the environment from the ionizing radiation of radiation source 16 (for which end, housing 24 has suitable lead plates or similar shielding means, for example); additionally, housing shell 24, which defines or realizes the recognizable building space for workpiece 10 to be built layer by layer in its housing interior, provides the option of performing the additive manufacturing process in protective atmosphere or under similar predefined conditions, wherein a possible thermal shielding from the environment can additionally also be ensured.

Figure 2:
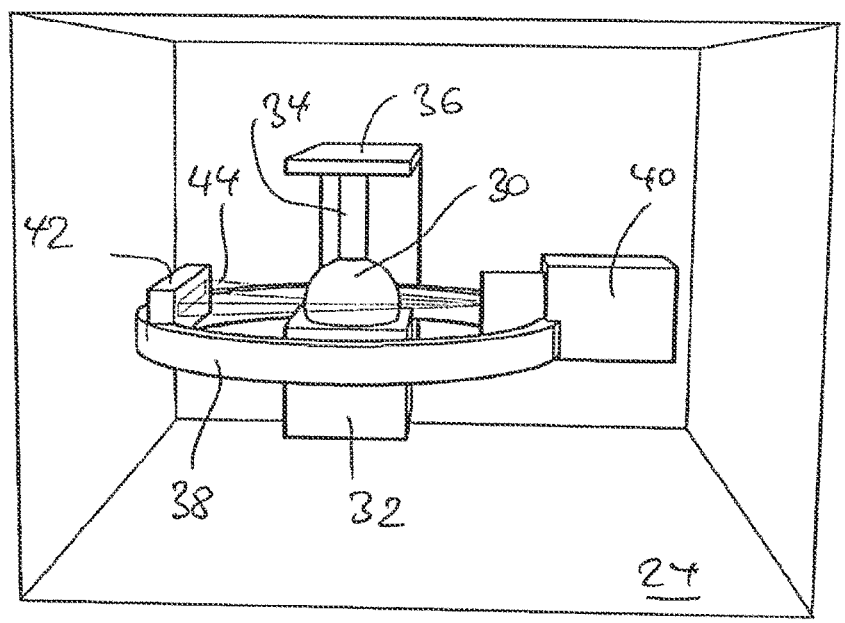
FIG. 2 shows a schematic view of the device for additive manufacturing of a workpiece according to a second exemplary embodiment of the invention, illustrated analogously to FIG. 1.

Compared to the exemplary embodiment of FIG. 1, the schematic view of FIG. 2 shows another realization of the invention (the present principle of the invention not being limited to the shown exemplary embodiments; in particular, the variants which are apparent from the exemplary embodiments can be combined and realized in any combination): In the present case, the component (workpiece) 30 in the process of being manufactured is supported by a fixed base unit 32; furthermore, assemblies 34, 36 illustrate an alternative AM machine in the form of a material application of the starting material which solidifies the material and in which component 30 is pulled out of a liquid material phase.

Developing workpiece 30 is measured within the meaning of the workpiece measurement means according to the invention already during the building (and potentially also after the completion) by an assembly composed of an X-ray source 40 which is fixed to a support 38 mounted so as to be rotatable and to which detector means, in the present example in the form of an X-ray line detector 42, are assigned on the opposite side in relation to workpiece 30.

Therefore, the fan-like beam path (reference sign 44) is initially two-dimensional compared to the exemplary embodiment of FIG. 1, whose beam path 20 is additionally split in the vertical direction. In the exemplary embodiment of FIG. 2, the assembly composed of irradiation source 40 and detector 42 also rotates about the workpiece which is supported in a stationary manner; this means different requirements for the type and realization of the (three-dimensional) additive manufacturing means 34, 36, in particular depending on the type of the workpiece to be built.

Compared to the exemplary embodiment of FIG. 1, in which a single shot of detector 22 (or a plurality of shots if workpiece support 12 rotates) without vertical displacement can lead to a predefined partial or complete image of the workpiece (in the current manufacturing state)—additionally or alternatively supplemented by a vertical displacement—, the measurement according to the invention would take place layer by layer without vertical tracking in the immediate building space and in the assembly context, following the building in layers by solidifying manufacturing means 34, 36 at a vertical distance which ensures the solidification, in the exemplary embodiment of FIG. 2.

What both technologies have in common is that a measurement of (in particular developing and not yet completed) workpiece 10 or 30 allows an intervention in the building process during this process on the basis of the obtained measurement data by a correction or by a decision to cancel the process (if tolerances which are no longer sufficient and correctable are detected).

Figure 3:
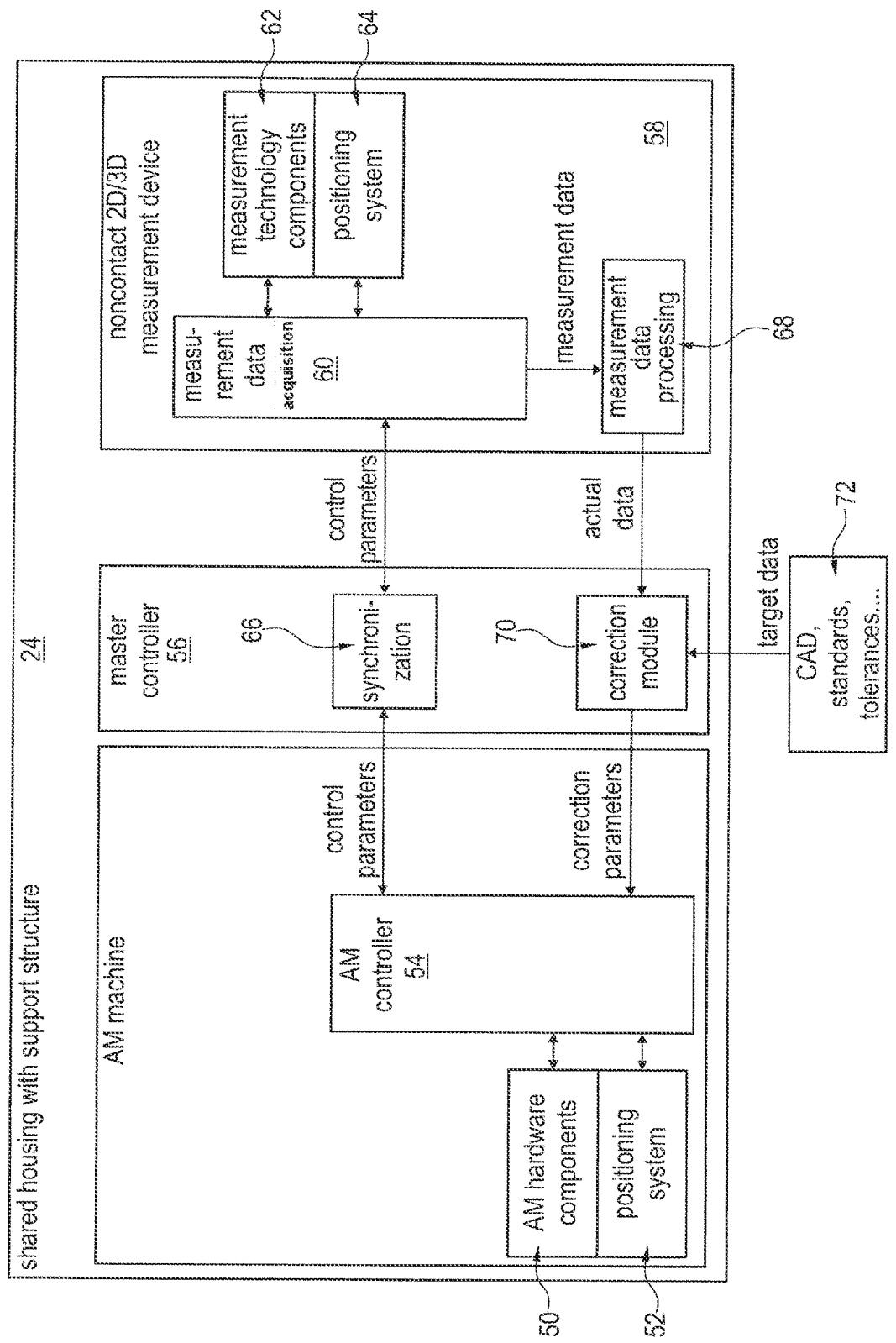
FIG. 3 shows a schematic block diagram describing the essential functional components in the exemplary embodiments of FIG. 1, FIG. 2.

The schematic block diagram of FIG. 3 illustrates the control, measurement and detection technology which controls the embodiments of FIG. 1, FIG. 2 (and FIG. 8 to be explained below) or which enables the operation according to the invention: On the left side of schematically shown housing 24, the additive manufacturing means ("AM machine") are shown in the form of functional components which allow the (otherwise known) manufacturing of the workpiece in layers by means of their hardware components 50 which allow the additive application of the material and by workpiece positioning 52. Said units (i.e., for example, 14 and 12 for FIG. 1; 34 for FIG. 2) are controlled by a manufacturing means control unit ("AM controller") 54 which communicates, via an interface control unit 56 referred to as "master controller", with the noncontact 2D/3D measurement device ("workpiece measurement means") 58 which is integrated according to the invention. More precisely, measurement components 62 (i.e., for example, realized by the pair of source 16 and detector 22 in FIG. 1, alternatively 40 and 42 of FIG. 2) of a measurement data detection unit 60 of workpiece measurement means 58 enable the noncontact measurement of the developing or completed workpiece by irradiation (which is also radiography if X-rays are used), and wherein a positioning system 64 is provided, for example in the case of workpiece measurement means of FIG. 2, which can be moved in a rotational manner The overview block diagram of FIG. 3 shows that a temporal synchronization of the measurement data acquisition and the additive manufacturing process is performed first in the form of synchronization means 66 which connect control units 54, 60, for example in order to specify the time of the irradiation and the measurement and the orientation or positioning of the measurement, preferably outside a recently applied (and potentially not yet solidified) material layer, by such a synchronization functionality.

According to another embodiment of the invention, a correction module 70 realized in unit 56 is assigned to a measurement data processing unit 68 of workpiece measurement means 58, wherein correction module 70 can use results of the workpiece measurement according to the invention (or the data generated therefrom) in a manner to be explained below to influence the additive manufacturing process (controlled by control unit 54) in the form of correction parameters.

More precisely, correction unit (correction module) 70 realizes a comparison between measurement specification data (for example in the form of standard, tolerance and/or electronic drawing data) which are provided or supplied by a schematically shown data specification unit 72 and current measurement data of measurement data processing unit 68. This comparison leads to a generation of correction parameter data which, when they are returned to control unit 54, change the additive manufacturing process in such a manner that subsequently applied layers can potentially get the workpiece to be built into an acceptable tolerance range or that possible identified deviations can be corrected as long as they are within an acceptable tolerance range. An advantageous embodiment of the functionality of the correction module provides that an additive manufacturing process is cancelled—before the workpiece to be built layer by layer is completed—in the form of a control of control unit 54, in particular if the comparison described above shows that tolerance limits applying to an acceptable or good part cannot (can no longer) be achieved with the current measurement data.

Figure 6:
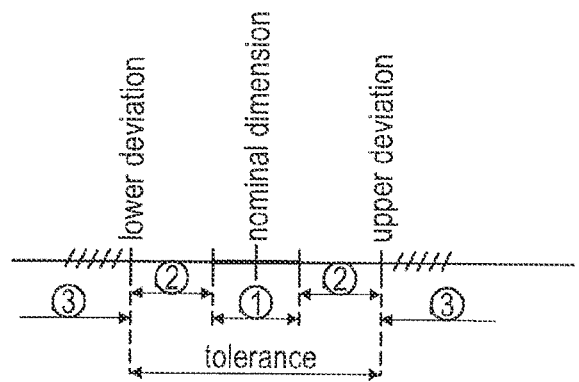
Figure 7:
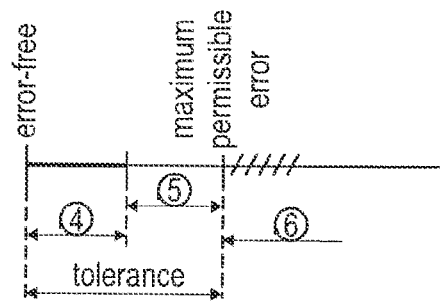

Details of this functionality are explained below on the basis of the flow sequence diagram of FIGS. 4, 5 and on the basis of the tolerance diagrams of FIG. 6, FIG. 7.

Figure 4:
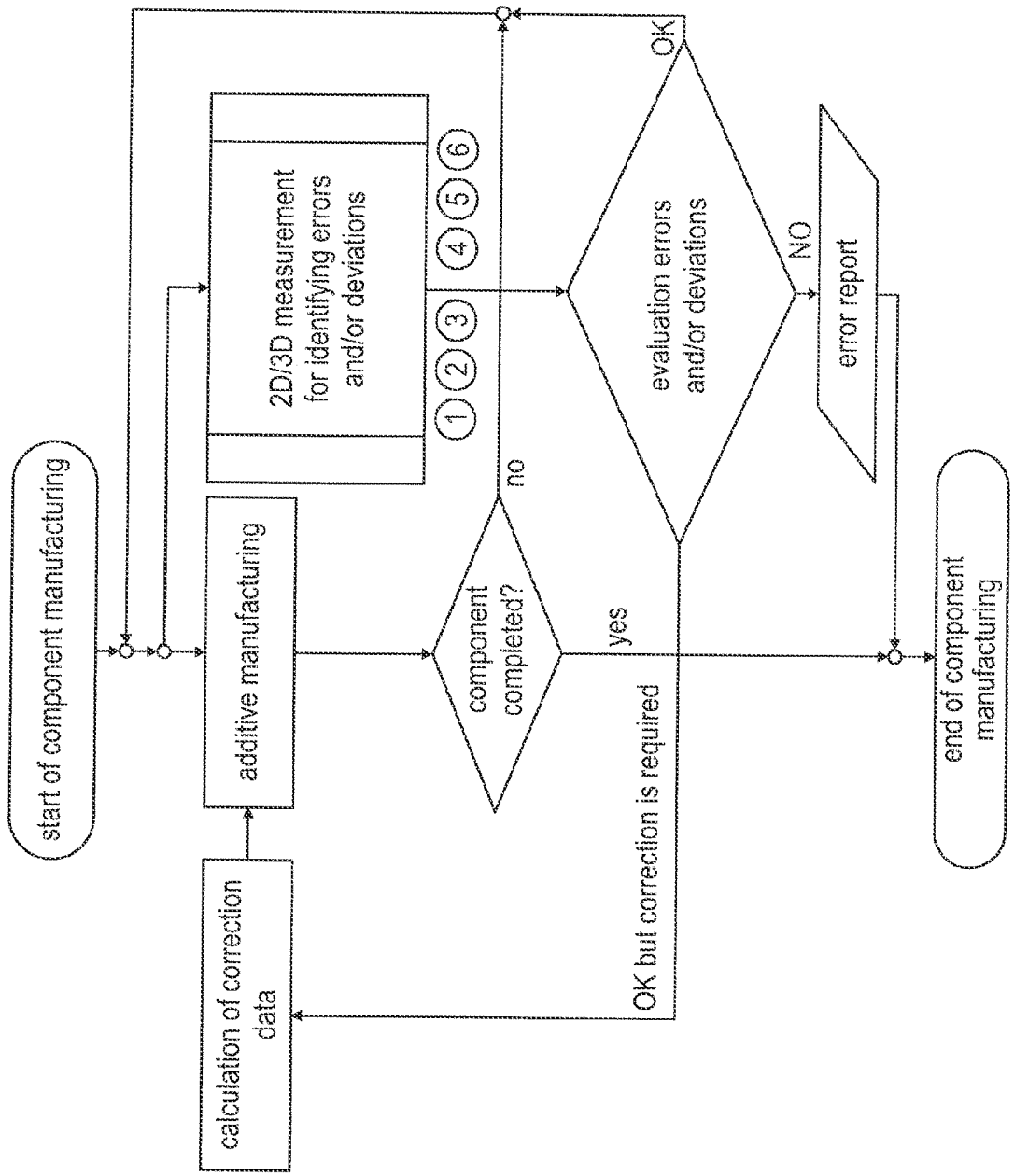
FIG. 4 to FIG. 7 show a sequence flow diagram and detailed and tolerance views illustrating an operating sequence during the additive manufacturing of a workpiece when the exemplary embodiments of FIG. 1, FIG. 2 are operated and illustrating an embodiment of the method according to the invention.
Figure 5:
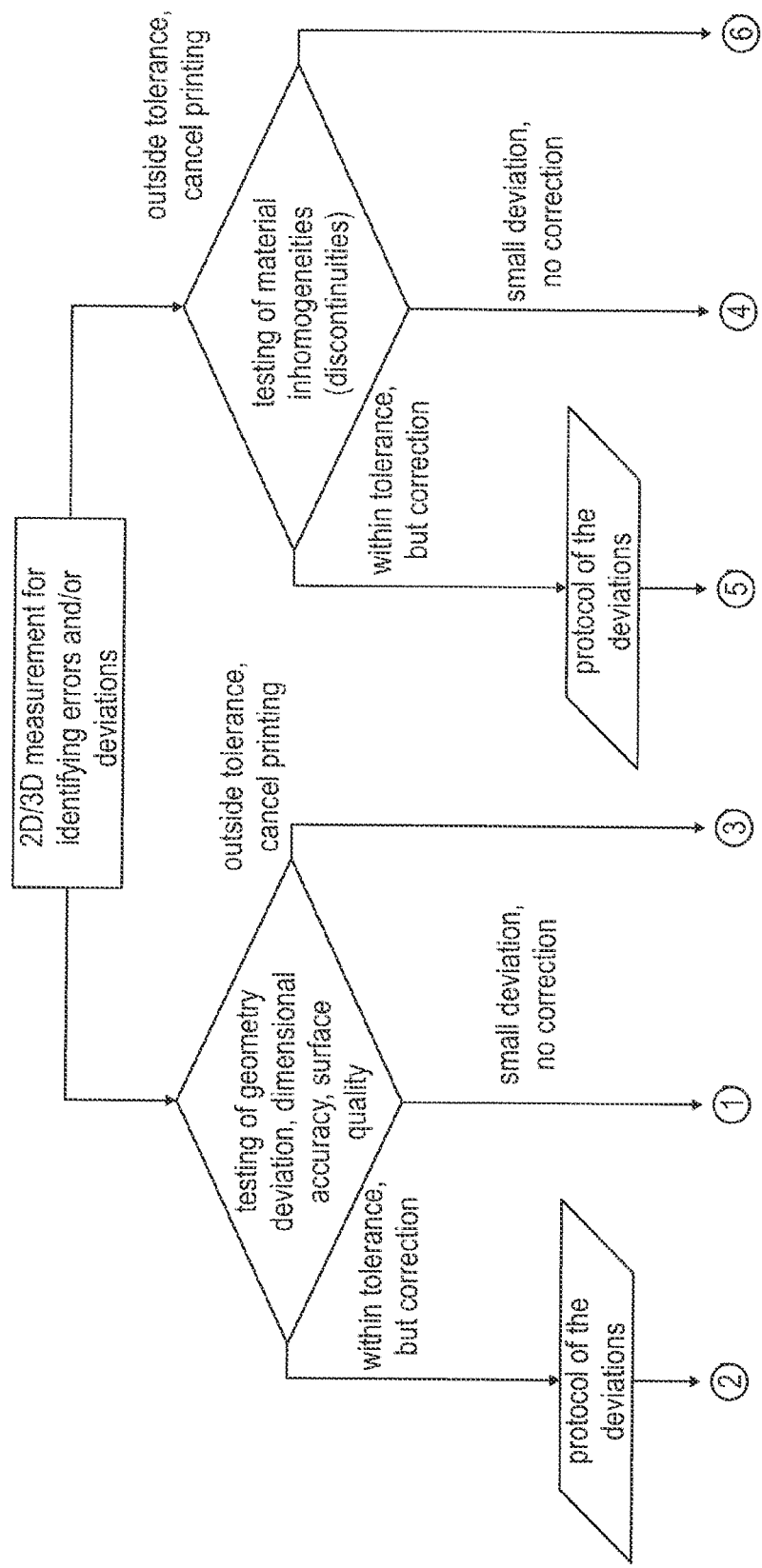

FIG. 4 (in combination with the detailed illustration of the 2D/3D measurement in FIG. 5) does not only show the operation of the device described above, but also, in particular, the functionality of the combined manufacturing and measurement method according to the invention. In FIG. 4, the workpiece (component) is built in an additive manner in the form of two nested loops until it is completed ("completed?"). A three-dimensional measurement (for example in the manner of the exemplary embodiment of FIG. 1) or two-dimensional, line-by-line measurement (in the manner of the exemplary embodiment of FIG. 2) for identifying errors and/or deviations is performed within said manufacturing loop, the result of the measurement determining whether it is a good part having no need for correction ("OK"), whether, if a tolerance limit is exceeded and the part can no longer be corrected, the manufacturing is to be cancelled and an error report ("NOK") is to be outputted, or whether, if a need for correction and an option for correction can be recognized ("OK but correction is required"), the measurement and correction loop returns to the manufacturing process including a calculation of correction values which influence the (further) additive manufacturing accordingly.

By the preferred radiography according to the embodiment, the measurement according to the invention by means of the workpiece measurement means in particular also detects the material distribution or the density of the (completely or partially built) workpiece, in particular the described X-ray tomography method generating information on the density distribution and on the geometry, with the possibility of identifying and detecting material errors or deviations from the target geometry (see process described above on the basis of FIGS. 4 to 7).

Depending on the size of the geometry deviation or a deviation from a target surface quality, the different actions described above can be triggered (left branch in FIG. 5, in addition explanation in FIG. 6): There is an area (1) which has small deviations from the nominal dimension and for which no correction is required within the margin of tolerance. At the edges of the margin of tolerance, areas (2), the dimensions are still within the tolerance, but the larger deviations compared to area (1) provide information for the initiation of correction measures to avoid values outside the tolerance. The size and length of area (2) depends inter alia on the distance of the manufacturing plane from the measurement plane. Depending on the specific realization, it may also be necessary to define area (2) with a distance from the tolerance limits. Furthermore, the analysis of the progression of the deviations over time allows the identification of trends and sometimes the timely detection and correction of a drift of manufacturing parameters. If the dimensions in area (3) are outside the tolerance, the manufacturing process has to be cancelled as described above. However, this is advantageous in any case because of the material and manufacturing time saved.

By analogy with the geometry deviation described above (left side of FIG. 5 in conjunction with FIG. 6), different actions are similarly triggered depending on the measured size of the material inhomogeneities (e.g. density) (right branch of FIG. 5 in conjunction with FIG. 7): There is an area (4) which has small inhomogeneities and for which no correction is required within the margin of tolerance for the material homogeneities. At the edges of the margin of tolerance (area (5)), the material inhomogeneities are still within the tolerance, but the greater material inhomogeneities compared to area (4) provide information for the initiation of correction measures to avoid values outside the tolerance. The size and length of area (5) depends inter alia on the distance of the manufacturing plane from the measurement plane. Depending on the specific realization, it may be required to define area (5) with a distance from the tolerance limit. The analysis of the progression of the material inhomogeneity over time again allows the identification of trends and sometimes the timely detection and correction of a drift of manufacturing parameters. If the material inhomogeneities in area (6) are outside the tolerance, the manufacturing process has to be cancelled. This, too, is advantageous because material and manufacturing time can be saved in relation to a completion of the complete workpiece (which is no longer reasonable).

Another variant of the method is characterized in that, depending on the size of the identified errors and/or the geometry deviations, components of different quality levels are classified and are accordingly used for different applications; in this respect, the sequence diagram of FIG. 4 after the evaluation step would have to be amended by (or replaced with) a corresponding (quality) classification step.

This shows that the present invention realizes and combines several advantages for the manufacturing of additively manufactured workpieces. Because of the timely detection of material inhomogeneities during the manufacturing, the manufacturing process can be corrected and the manufacturing (3D printing) quality can thus be improved. Reject is significantly reduced or completely avoided. Because of the timely detection of deviations from the contour or the geometry or the dimensional accuracy or the surface quality during the manufacturing, the manufacturing process can likewise be corrected and the dimensional accuracy and the quality of the produced parts can thus be improved. If errors or deviations outside a specified permissible tolerance occur, the manufacturing process can be cancelled immediately, which has corresponding advantages with respect to the saving of material and manufacturing time.

In addition to these advantages, the present invention provides the option of obtaining a completely or partially tested component-depending on the requirement and specification-directly following the completion of the manufacturing process. This in particular creates an important element for a realization of a so-called industry 4.0 approach for additively manufactured components (AM components), and a test subsequent to the manufacturing would no longer be necessary, in particular for safety-related components which require a 100% manufacturing test.

Figure 8:
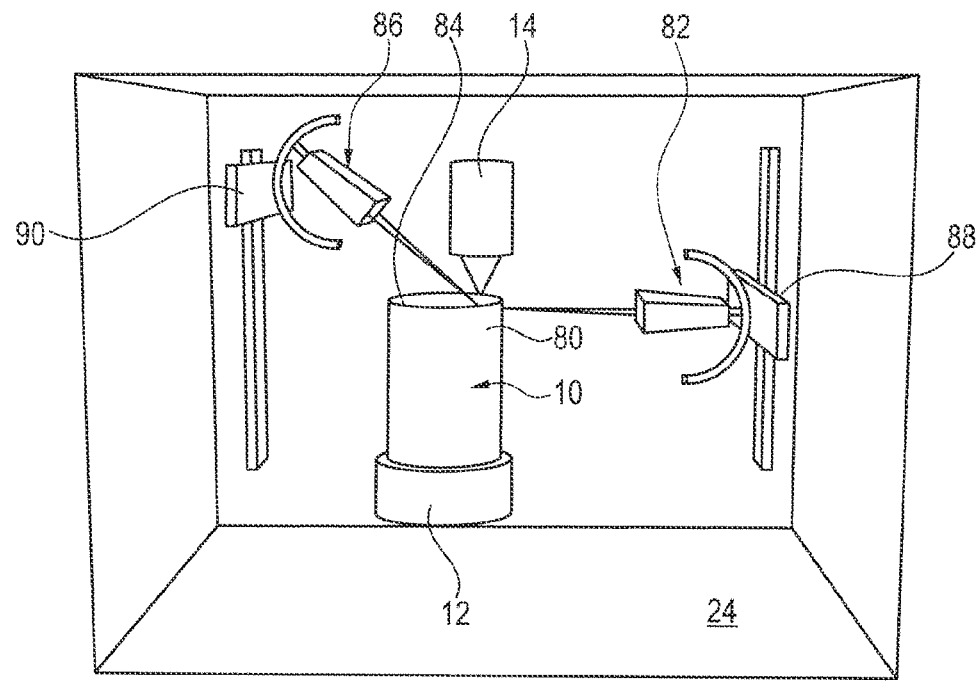
FIG. 8 shows a schematic view illustrating a third exemplary embodiment of the device for additive manufacturing of a workpiece.

According to another embodiment of the invention, the geometry of the additively manufactured workpiece is measured by means of non-ionizing radiation, as it is explained on the basis of the exemplary embodiment of FIG. 8.

In a central, cell-like housing 24 for determining a cell-like building space for a workpiece 10 to be manufactured on a rotatable support 12 and by means of additive manufacturing means 14 by analogy with the exemplary embodiment of FIG. 1, workpiece 10 is provided with a line pattern by irradiation of an external outer wall 80 on one side by means of a first laser triangulation unit 82 and with another line irradiation of an internal outer wall 84 on the other side by means of a second laser triangulation unit 86 (both irradiations being optically detected, in a manner known per se, in the form of a known, predefined angle using units 82 or 86 and a surface measurement, in particular also a determination of surface deviations, being performed on the basis of a triangulation of the projected and recorded pattern).

In contrast to the computer tomographic methods described on the basis of FIGS. 1, 2, the irradiation source and detector means are therefore not located on opposite sides, but on the same side of the workpiece; they are, however, disposed at the angle described above.

Furthermore, cross tables 88, 90, which can be electronically controlled, allow a desired or required displacement or tilting by means of their respective slides, which support triangulation means 82 or 86, in order to cover the internal and external walls of workpiece 10 (which is hollow-cylindrical in the present case). During the measurement, workpiece 10 is usually still being built by additive manufacturing means 14, and rotary plate 12 ensures a suitable rotational positioning of the workpiece for the measurement and building.

An integration into the manufacturing process takes place corresponding to the sequence described above (in relation to the geometry deviation, i.e., left branch of FIG. 5).

Another embodiment of the invention (not shown in the figures) which is particularly suitable for organic materials for the additive manufacturing of the workpiece (e.g. polymers) provides that a magnetic resonance imaging device is provided instead of the X-ray tomographic workpiece measurement means realized in FIG. 1, FIG. 2. Such a solution has the advantage that no movement axes are required and that housing 24 does not have to be provided with special radiation protection measures (such as lead plates for shielding the X-rays) (however, precautions for shielding the strong magnetic fields related to the magnetic resonance imaging may be required).

CAD data, on the basis of which the described specification data (and therefrom correction data, if applicable) are advantageously generated via the known standard format STL, for example, are usually used as a data source for the additive manufacturing according to the invention. Nevertheless, in particular scanned data of existing model components (model workpieces) can also be used as a data source. For instance, in another embodiment of the invention, the master data (specification data) of the model workpiece could be generated (recorded) by means of the existing workpiece measurement data in a first step and the master data can then be converted into STL data which are supplied to the additive manufacturing means.

Alternatively, the conversion of the data along the process chain from the detector means to the control format of the 3D printer (additive manufacturing means) can be performed directly and without intermediate data format. In this process, the printer data are generated as contour data in a machine-specific format (e.g. in the so-called G-code) directly from projection output data of the detector means realized as an X-ray detector without intermediate data conversion into an interpolated intermediate format, for example the described STL format and/or another three-dimensional voxel format.

The present invention is not limited to the described exemplary embodiments (product and method); other embodiments and combinations of the described principles according to the invention are also conceivable and possible, in particular depending on a respective manufacturing, material and measurement context.

The invention claimed is:

1. A device for additive manufacturing of a workpiece (10; 30), comprising:
   a cell building space (24) for the workpiece to be built, additive manufacturing means (14; 34, 36) provided on or in the building space,
   workpiece measurement means (16, 18, 20; 40, 42; 82, 86) on or in the building space in such a manner that the workpiece measurement means provides the developing or completed workpiece with irradiation from an irradiation source (16; 40) and/or a nuclear spin magnetic field excitation, and
   detector means (22; 42) configured to detect an irradiation image of the workpiece provided with the irradiation on and through an outer wall of the workpiece and/or to detect a nuclear spin image of the workpiece provided with the magnetic field excitation and to generate workpiece measurement data from the irradiation image or the nuclear spin image, whereas the irradiation source (16; 40) is configured to provide irradiation along a beam path (20) through the workpiece to the detector means (22; 42), which is disposed along the beam path (20) at an opposite side of the workpiece from the irradiation source (16; 40).

2. The device according to claim 1, wherein the irradiation source is configured to generate X-rays and/or ionizing radiation at least partially penetrating the workpiece and the detector means are configured to detect the irradiation image which is or can be generated by radiography and are disposed relative to the workpiece and to the irradiation source.

3. The device according to claim 1, wherein the irradiation source (82, 86) is configured to project an image pattern which has dots, lines and/or stripes and/or which is in the visible spectral range onto the workpiece outer wall (80, 84) and wherein the detector means (82, 86) configured to optically detect the image pattern are disposed in order to perform an optical measurement method in a predefined angle relation to the irradiation source which allows triangulation.

4. The device according to claim 1, wherein the additive manufacturing means further comprises a manufacturing means control unit (54) for controlling the building of the workpiece, a correction module (70) assigned to and/or connected upstream of the manufacturing means control unit (54) in such a manner that the building can be changed or ended in response to a correction signal of the correction module (70), wherein the workpiece measurement data generated by the detector means or reconstruction data generated therefrom can be processed by the correction module (70).

5. The device according to claim 4, further comprising a data specification unit (72), and wherein the correction module is configured to compare the generated workpiece measurement data with measurement specification data from the data specification unit (72) for the developing and/or completed workpiece, and to determine, based upon a tolerance and/or threshold, a workpiece complying with the measurement specification data, a correctable developing workpiece and/or a reject workpiece.

6. The device according to claim 1, wherein the detector means and/or the irradiation source are directed at the outer wall in such a manner that only one outer wall section of a finished contour and/or made of solid or solidified layer material is irradiated or detected during the building of a workpiece built layer by layer, wherein the irradiated and/or detected outer wall section has a distance from a layer material of the outer wall in the melted state.

7. The device according to claim 1, wherein the irradiation source and the detector means are provided and configured to be movable in relation to a support (12; 32) of the built workpiece or workpiece to be built in the building space, in a fixed relative position to one another.

8. The device according to claim 7, wherein a single-line or multiline line detector (42) of the detector means is assigned to the irradiation source (40) realized as an X-ray source in such a manner that a detector height of the single-line or multiline line detector is smaller than a height of the built workpiece.

9. The device according to claim 1, wherein the workpiece measurement data is selected from the group consisting of 3-dimensional workpiece contour data, workpiece homogeneity, density data and combinations thereof.

10. The device according to claim 4, wherein the correction module (70) is assigned to and/or connected upstream of the manufacturing means control unit (54) in such a manner that the building can be geometrically changed.

11. The device according to claim 7, wherein the irradiation source and the detector means are provided and configured to be movable in relation to the support (12, 32) of the built workpiece or workpiece to be built in the building space along a spiral and/or circular path around a longitudinal axis of the workpiece and/or of the direction in which the workpiece is built.

12. The device according to claim 1, wherein the workpiece measurement means (16, 18, 20; 40, 42; 82, 86) are configured to provide the developing or completed workpiece with irradiation from an irradiation source (16; 40) and/or a nuclear spin magnetic field excitation on and through the outer wall of the workpiece, and wherein the detector means is configured to detect an irradiation image of the workpiece provided with the irradiation and/or to detect a nuclear spin image of the workpiece provided with the magnetic field excitation and to generate workpiece measurement data from the irradiation image or the nuclear spin image, whereby process related defects at the outer wall and also within the workpiece can be detected.

* * * * *